(12) United States Patent
Satish et al.

(10) Patent No.: US 8,868,719 B1
(45) Date of Patent: Oct. 21, 2014

(54) IDENTITY AND REPUTATION MONITORING

(75) Inventors: Sourabh Satish, Fremont, CA (US);
Brian Hernacki, San Carlos, CA (US)

(73) Assignee: Symantec Corporation, Mountain View, CA (US)

(*) Notice: Subject to any disclaimer, the term of this patent is extended or adjusted under 35 U.S.C. 154(b) by 1068 days.

(21) Appl. No.: 11/590,389

(22) Filed: Oct. 31, 2006

(51) Int. Cl.
*G06F 15/173* (2006.01)
*G06F 21/42* (2013.01)

(52) U.S. Cl.
CPC ...................................... *G06F 21/42* (2013.01)
USPC .............................. 709/224; 705/35; 713/170

(58) Field of Classification Search
CPC ....... G06F 21/31; G06F 21/42; G06F 21/316; G06Q 20/4014
USPC ........................................ 709/224; 705/39, 35
See application file for complete search history.

(56) References Cited

U.S. PATENT DOCUMENTS

| | | | |
|---|---|---|---|
| 6,614,781 B1 * | 9/2003 | Elliott et al. .................. 370/352 |
| 7,200,635 B2 * | 4/2007 | Yashchin et al. ............. 709/206 |
| 7,225,156 B2 * | 5/2007 | Fisher et al. ..................... 705/50 |
| 2002/0087471 A1 * | 7/2002 | Ganesan et al. ................ 705/40 |
| 2002/0099649 A1 * | 7/2002 | Lee et al. ......................... 705/38 |
| 2002/0161701 A1 * | 10/2002 | Warmack ........................ 705/39 |
| 2003/0061520 A1 * | 3/2003 | Zellers et al. ................. 713/202 |
| 2004/0254868 A1 * | 12/2004 | Kirkland et al. ................ 705/35 |
| 2005/0160004 A1 * | 7/2005 | Moss et al. ...................... 705/14 |
| 2006/0031470 A1 * | 2/2006 | Chen et al. ..................... 709/224 |
| 2006/0204051 A1 * | 9/2006 | Holland ......................... 382/115 |
| 2006/0251226 A1 * | 11/2006 | Hogan et al. ............. 379/114.15 |
| 2006/0282660 A1 * | 12/2006 | Varghese et al. .............. 713/155 |
| 2007/0100751 A1 * | 5/2007 | Carver ............................ 705/44 |
| 2008/0010687 A1 * | 1/2008 | Gonen et al. .................... 726/28 |

* cited by examiner

*Primary Examiner* — Tamara T Kyle
*Assistant Examiner* — James Forman
(74) *Attorney, Agent, or Firm* — Wilmer Cutler Pickering Hale and Dorr LLP (57) ABSTRACT

Monitoring for potential misuses of identity information is disclosed. A profile comprising a user's identity information is received. An indication from a third party website that at least a portion of the identity information in the user's profile is being or has been provided to register at the third party website, alter user information stored by the third party website, or both is received. Whether the indicated use of the identity information is a potential misuse is evaluated.

13 Claims, 5 Drawing Sheets

IDENTITY AND REPUTATION MONITORING

BACKGROUND OF THE INVENTION

People are increasingly transacting online in lieu of or in addition to the transactions that they conduct in brick and mortar stores and other venues. For example, instead of purchasing a movie in a physical store, a consumer may instead purchase the movie from a large electronic retailer or an auction site. The consumer may also make use of an electronic payment service to acquire the movie from a smaller virtual store or another individual. Similarly, blogs and virtual meeting places such as bulletin boards (referred to herein collectively as "social networking sites") are increasingly used to communicate in lieu of more traditional methods such as the telephone or physical interactions. As used herein, "electronic transactions" include the interactions (whether financial, social, etc.) that a user has with a site (such as posting to a blog, commenting on a story, and purchasing an item).

Unfortunately, electronic transactions can be problematic. Often a user must establish an account at a site with which he or she transacts, sometimes including personal/sensitive information such as a home address, age, phone number, credit card number, etc. (referred to herein collectively as "identity information"). If a site is breached (or is otherwise unscrupulous in managing identity information), users may never be informed. Nefarious individuals may use identity information belonging to another person (e.g., billing address and credit card number) to make fraudulent purchases and may evade detection until it is too late for the victim to gain any recourse.

A person's reputation is another example of identity information that can be compromised online. On auction sites, users are typically encouraged to rate their transactions with one another (e.g., as a feedback score). In the case of blogs, what is said about an individual or attributed to that individual can affect that user's reputation. If the reputation information is false, e.g., because unflattering feedback is left or because unfounded accusations are made in a blog, the victim of that inaccurate information may never be informed. When an employer, buyer, seller, or other interested party learns, for example through an Internet search on a victim's name, unflattering, inaccurate information about the victim, the victim may be harmed financially, professionally, etc., potentially without ever knowing that the information exists and/or was viewed.

Therefore, it would be desirable to have a better way to protect identity information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
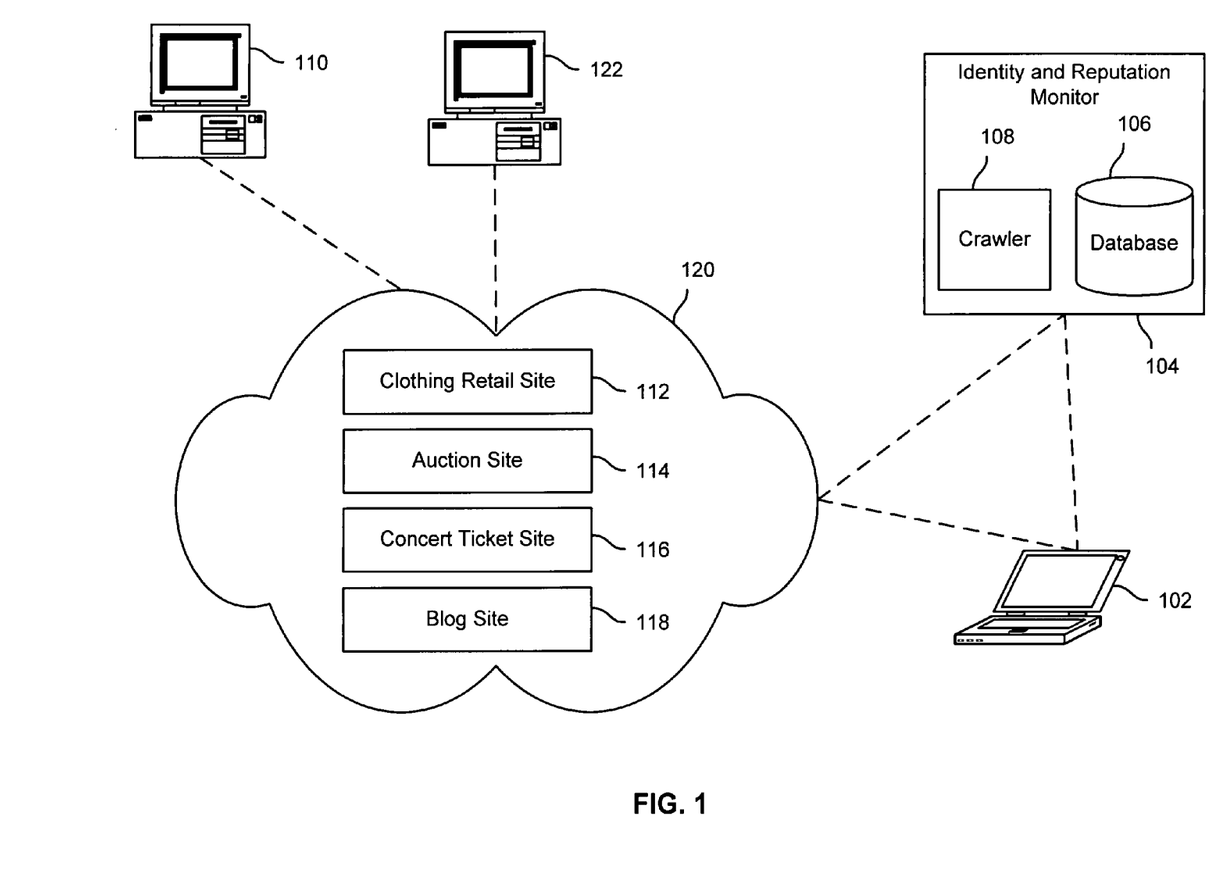
FIG. 1 is a diagram illustrating an embodiment of an environment having identity and reputation monitoring.

FIG. 1 is a diagram illustrating an embodiment of an environment having identity and reputation monitoring. In some embodiments network 120 includes the Internet or a portion thereof. In some embodiments, network 120 includes a plurality of networks and/or includes one or more intranets.

In the example shown, user 102 communicates (e.g., with a web browser) with various sites in network 120 (also referred to herein as "hosts" 120). Site 112 is an electronic commerce site that sells clothing online. Site 114 is an auction site which permits individuals to buy and sell items from one another. Site 116 arranges the sale of concert tickets. Site 118 is a blogging site. In some cases, a site is hosted on a single server. In other cases, such as for load balancing reasons, a site may be replicated or split across multiple servers (or other hardware).

Some of the sites in network 120 require that visitors register with the site and authenticate in some manner on subsequent visits to that site, such as before granting access to particular services. For example, visitors to clothing site 112 typically add items to their shopping carts. Upon selecting a checkout option, visitors are directed to a login/registration page. If the visitors do not have existing accounts, they are directed to create them by providing identity information such as name, address, age, bank account or credit card number, loyalty club number, etc. Some websites collect identity information (e.g., shipping address and credit card information) but provide a user with the option of saving the information for future use (e.g., establishing an account for future purchases) or not saving the information (e.g., making a one time purchase). As used herein, "establishing an account" with a site and/or "registering for an account" at a site includes the situation where a visitor makes a one time use of identity information with the site.

Adversary 110 desires to perpetrate fraud on user 102 by misusing user 102's identity information in bogus transactions with hosts 120. Defamer 122 doesn't like user 102 and desires to spread disinformation about user 102 in the hopes of getting user 102 fired.

User 102 can protect himself from the illicit intentions of adversary 110 and defamer 122 by making use of the services provided by monitor 104. In the example shown, monitor 104 alerts user 102 of attempted misuses of the user's identity information, and also alerts user 102 of messages posted about user 102 on assorted forums. In various embodiments, monitor 104 performs one of the services and does not perform the other, and/or provides different services to different users, e.g., based on a service plan selected by the user.

Suppose adversary 110 unscrupulously obtains some of user 102's identity information (e.g., by digging through user 102's trash, purchasing it from a credit agency, hacking a server on which user 102's information is stored, etc.). Adversary 110 would like to use that ill-gotten identity information to purchase goods at clothing site 112, but instead of having the goods shipped to user 102, have them shipped to a location of adversary 110's choosing (and without user 102's knowledge).

As described in more detail below, monitor 104 stores user 102's identity information in database 106 as a user profile. When adversary 110 attempts to create an account at clothing site 112, the clothing site contacts monitor 104 to determine whether the account creation is authorized by user 102. If the account creation is not authorized (such as in this case), clothing site 112 is notified appropriately and may deny adversary 110's request, report the request to authorities, etc., as applicable.

Similarly, suppose that adversary 110 would like to leverage an existing account that legitimately belongs to user 102, such as at concert ticket site 116. When adversary 110 attempts to modify user 102's shipping address as stored by the ticket site, the ticket site contacts monitor 104 to determine whether the change of identity information (shipping address) is authorized by user 102. If the alteration is not authorized (such as in this case), the ticket site is notified appropriately and may deny adversary 110's request, require that adversary 110 provide additional identity information (that adversary 110 does not likely posses), lock the account, etc., as applicable.

Monitor 104 can also alert user 102 when information that may influence user 102's reputation is posted. For example, suppose user 102 is an occasional user of auction site 114. All of user 102's dealings on auction site 114 have been exemplary, and user 102 has received positive feedback ratings from the parties with which he has dealt through auction site 114. Suppose adversary 110 has noticed that user 102 has a good reputation at auction site 114 and has also noticed that user 102 visits auction site 114 infrequently (e.g., based on how long ago feedback was left for user 102 or how long ago user 102's auctions closed). Adversary 110 might attempt to appropriate user 102's account at auction site 114 and offer expensive items for sale that adversary 110 does not have, relying on user 102's good reputation to lull auction site visitors into believing that the auctions are legitimate.

Since user 102 only rarely logs into auction site 114, user 102 may not notice the bogus auctions until considerable time has passed and his reputation is ruined by the negative feedback left by victims of adversary 110's scheme. However, in the example shown, auction site 114 provides a "feed" of the feedback left about members of its site to monitor 104. As described in more detail below, when monitor 104 detects negative feedback attributed to user 102, it promptly alerts user 102 who can then work with auction site 114 to reverse the harm done by adversary 110 to user 102.

Monitor 104 can also protect user 102 from defamatory remarks made about the user at social networking sites. For example, suppose that defamer 122 and user 102 both have accounts at a popular blogging site 118. User 102 may configure monitor 104 to alert user 102 any time user 102's handle (e.g., 'tej123') is mentioned on the site. As described in more detail below, monitor 104 may be configured in a variety of ways, e.g., to look for mention of user 102's real name in addition to user 102's handle. In some cases social networking sites work in cooperation with monitor 104 and automatically provide notifications of assorted activity to monitor 104, e.g. through RSS or other syndication. In other cases, a site in network 120 may not cooperate with monitor 104 (e.g., because the are small, personal websites). In some embodiments, monitor 104 includes a crawler 108 that detects evidence of user 102's identity or reputation information and can provide protection to user 102 nonetheless.

In various embodiments monitor 104 is also a CardSpace identity provider or otherwise supports the CardSpace framework. Monitor 104 may also support other identity meta-systems (such as Meebo®, Sxip™, Google™ TPass, and Verisign® Personal Identity Provider) and the techniques described herein are modified accordingly. In some embodiments, the infrastructure provided by portions of monitor 104 is located on and/or replicated across a plurality of servers rather than the entirety of monitor 104 being co-located on a single platform.

Figure 2:
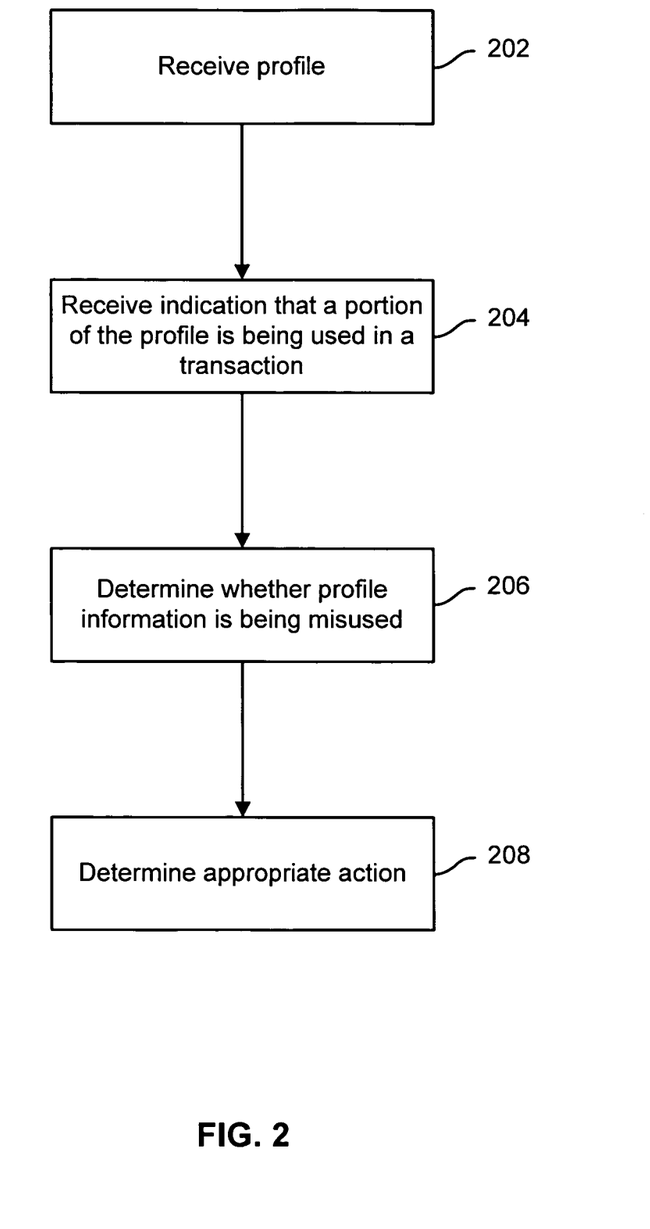
FIG. 2 is a flow chart illustrating an embodiment of a process for monitoring for potential misuses of identity information.

FIG. 2 is a flow chart illustrating an embodiment of a process for monitoring for potential misuses of identity information. In the example shown, the process is implemented by monitor 104. The process begins at 202 when a profile is received. In some embodiments user 102 visits monitor 104 such as with a web browser. User 102 provides identity information to monitor 104 (e.g., via an interactive wizard) which in turn creates and stores the received identity information as a profile at 202. Examples of information that could be received at 202 include all of the identities (e.g., the usernames) that the user has established at various sites in network 120—where the user shops, blogs, etc.

In various embodiments, other methods of profile acquisition are used instead of or in addition to collecting the information from a user through a form. For example, an agent resident on user 102's computer may gather the information based on information (entered passwords, ZIP codes, addresses, etc.) cached with user 102's web browser. Such an agent may automatically provide the information to monitor 104. If monitor 104 provides or works in conjunction with other services, such as those of a CardSpace framework identity provider, a user profile may be generated or augmented by information from that service. Profile information may also be collected by monitor 104 via a third party such as a credit bureau or information aggregator. Profile information may also be collected from a plurality of sources. In some cases the received profile includes both identity information and reputation information (e.g., auction site feedback scores).

At 204, an indication that a portion of the identity information included in the profile is being used in a transaction is received. As described above, examples of transactions include requests by an individual to open new accounts or otherwise register with a third party site (e.g., sites 112-118) and requests by an individual to alter existing account information maintained with those sites. In some cases the indication is received directly from a third party site. For example, when a visitor to site 112 requests to create a new account, site 112 may provide details (e.g., the visitor supplied email address, home address, phone number, etc.) to monitor 104 and inquire whether that identity information belongs to one of monitor 104's users at 204. In other cases, such as in the reputation monitoring scenario described above, the indication may be received from a crawler such as crawler 108 that is configured to obtain evidence of uses of identity information without the cooperation of the third party site.

At 206 it is determined whether the information received at 204 indicates that the profile information is being misused. One way to determine misuse is to determine whether the information received at 204 matches identically with the information stored in the profile. Suppose, for example, that user 102 has supplied a name ("Tom Smith"), an email address ("tom@example.com"), a phone number ("800-555-1212") and a mailing address ("Box 123; Anywhere Colorado") to monitor 104 (e.g., at 202). If monitor 104 subsequently sees an indication from site 118 that a visitor is attempting to create an account using precisely the same credentials as were provided by user 102 for use as a profile, monitor 104 may be configured to treat that transaction as legitimate and automatically confirm the validity of the request at 208. Similarly, if the information received at 204 bears little meaningful resemblance to any of the information stored in database 106, then monitor 104 may be configured to treat the transaction as irrelevant to monitor 104's user base and inform the third party site that the information doesn't sufficiently match any users at 208. Such may be the case, for example, if the only information received at 204 is a first name "Tom" or an IP address that is shared by many individuals.

Monitor 104 may also be configured to always verify all new account requests with the user, to always verify requests to alter the information stored with site 118, etc. In various embodiments what steps are taken to determine whether profile information is being misused are configurable by the user, by the administrator of monitor 104, by site 118, and/or a combination thereof.

One indication of misuse is the presence of some identity information that is stored in the user's profile accompanied by the presence of identity information that is different from that stored in the profile. Suppose that the information received at 204 includes the name, Tom Smith, and the phone number 800-555-1212, but a different email address (e.g., "joe@example.com"). It is possible that user 102 is legitimately establishing a pseudonym, or an account for a family member. However, it is also possible that someone is attempting to impersonate user 102. In some embodiments, this type of information mismatch is automatically treated as a misuse and the third party site supplying the information to monitor 104 is instructed to deny the new account creation at 208. Monitor 104 may also be configured to contact user 102 in such a scenario for further clarification. If user 102 has supplied multiple email addresses, monitor 104 may be configured to alert user 102 of possible misuses via all of the email addresses, or if the information received at 204 includes one address and user 102 has additional addresses listed in the profile received at 202, monitor 104 may be configured to notify the user via the additional addresses and not send an alert to the address received at 204.

In some cases, the received identity information may map to multiple users' profiles. For example, suppose that a blog site does not require email addresses to register, but instead merely requires a name and ZIP code. If database 106 includes two Tom Smiths that live in the supplied ZIP code, at 206 monitor 104 may attempt to disambiguate which, if either, Tom requested the account to be opened by alerting both Toms. If one acknowledges that the account was created by him, his profile can be updated to include the blog site and the other Tom's profile can be updated to reflect a disassociation with the first Tom's information. If neither Tom acknowledges the account, the blog site can be instructed accordingly.

Similarly, entities such as families sometimes share identity information such as email addresses (e.g., "SmithFamily@example.com"). In some embodiments users may specify tolerances to be included in the determination performed at 206 (e.g., only alert at 208 if the mailing address doesn't match), or other actions at 208 such as requesting that a group of users be alerted any time information associated with a profile of any member of the group is received at 204.

In some cases, monitor 104 may mistake a legitimate transaction for a misuse of identity information. For example, suppose that user 102 opened account at site 116 and then subsequently opened up a second post office box. The first time that user 102 attempts to have something purchased on site 116 shipped to the new address monitor 104 would be alerted. In this case, the transaction is a legitimate one and monitor 104 may provide user 102 with the opportunity to update his profile to include the new address, and/or may automatically alter user 102's profile based on whether user 102 verifies the new address as legitimate.

Other actions that may be taken at 208 include explicitly instructing the site providing the information at 204 that a transaction is legitimate or illegitimate, only responding when the transaction is legitimate, only responding when the transaction is illegitimate, returning a score that indicates with what certainty monitor 104 believes the transaction is legitimate, etc.

In various embodiments, the profile received at 202 is leveraged to personalize security content delivered to the user. For example, monitor 104 typically knows the websites that a user interacts with. If one of the sites is compromised, all users of monitor 104 who have accounts at the compromised website may be simultaneously notified by monitor 104, irrespective of whether the compromised site is obliged to inform those users. Additionally, an affected user may specify the types of actions that may be taken in response to such alerts, such as by automatically preventing new web accounts from being opened in the name of the user, etc.

Figure 3:
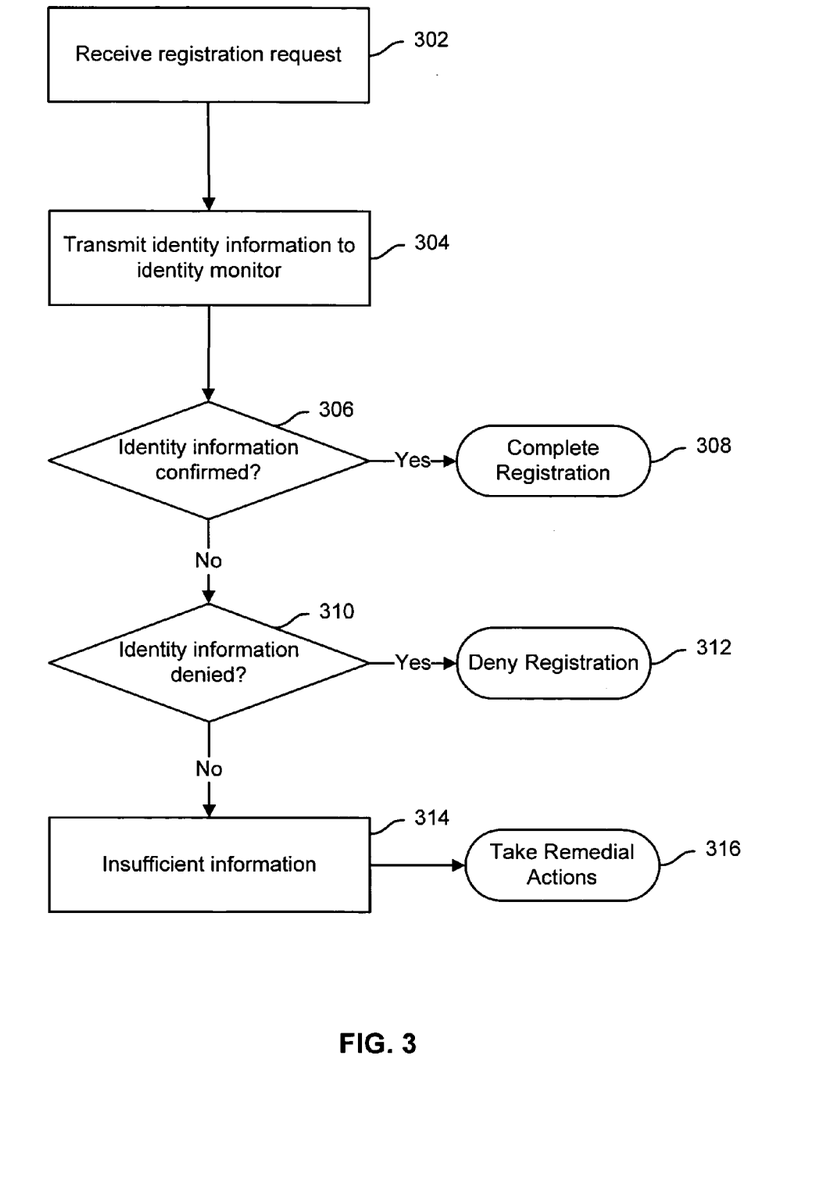
FIG. 3 is a flow chart illustrating an embodiment of a process for determining the legitimacy of a registration request.

FIG. 3 is a flow chart illustrating an embodiment of a process for determining the legitimacy of a registration request. In the example shown, the process is implemented by a site such as clothing retail site 112.

The process begins at 302 when a registration request is received. For example, at 302 a visitor to site 112 may have clicked a registration button, provided identity information and clicked a submit button. At 304 the identity information or a portion thereof is transmitted to identity monitor 104. In some cases certain information may be omitted by site 112 from the transmission, such as a user's loyalty card number (when attempting to register with an airline loyalty site). In other cases all of the collected information is sent at 304.

Multiple responses may be received back from identity monitor 104. For example, identity monitory 104 may explicitly state that the identity information has been confirmed (and that the user to whom the identity information belongs was ultimately responsible for the request received at 302). If the identity information is confirmed (306), the registration request can be safely completed by site 112 (308).

Monitor 104 may also explicitly deny that the identity information has been confirmed (and that the user to whom the identity information belongs did not request the opening of an account at 302). If the identity information was denied (310), the registration request should typically not be completed by site 112 (312). In some cases, rather than refusing to complete the registration at 312, other measures may be taken in response to a denial of information at 310. For example, site 112 may ask the visitor that submitted the request at 302 to check the submission for typos, may ask the visitor to send in proof of identity (such as a copy of a driver's license or passport), may ask an existing member to vouch for the visitor's application, etc.

Site 112 may also receive an indication that monitor 104 has insufficient information to determine the legitimacy of the request. For example, if the only information supplied at 304 is a first name or other commonly held information, there may be too many users in database 106 to make a reasonable determination of whether the request is legitimate. In various embodiments, the indications received at 306, 310, and 314 and the actions taken at 308, 312, and 316 may vary as applicable. For example, site 112 may be configured to fail-safe—if no response is received from monitor 104, the lack of response may be treated by site 112 as an indication that the identity information is denied (i.e., the user to whom the identity information belongs did not request a new account at 302 and the user's information is being misused by the visitor). Similarly, site 112 may be configured more permissively such that a lack of response from monitor 104 is treated as a confirmation of the identity information.

If the information is neither confirmed nor denied (314) a variety of actions can be taken. The account can be created, the account can be denied, the visitor that submitted the information at 302 can be asked to provide additional identity information, can be charged a deposit, can be required to sign a statement attesting to his identity, etc. at 316.

Figure 4:
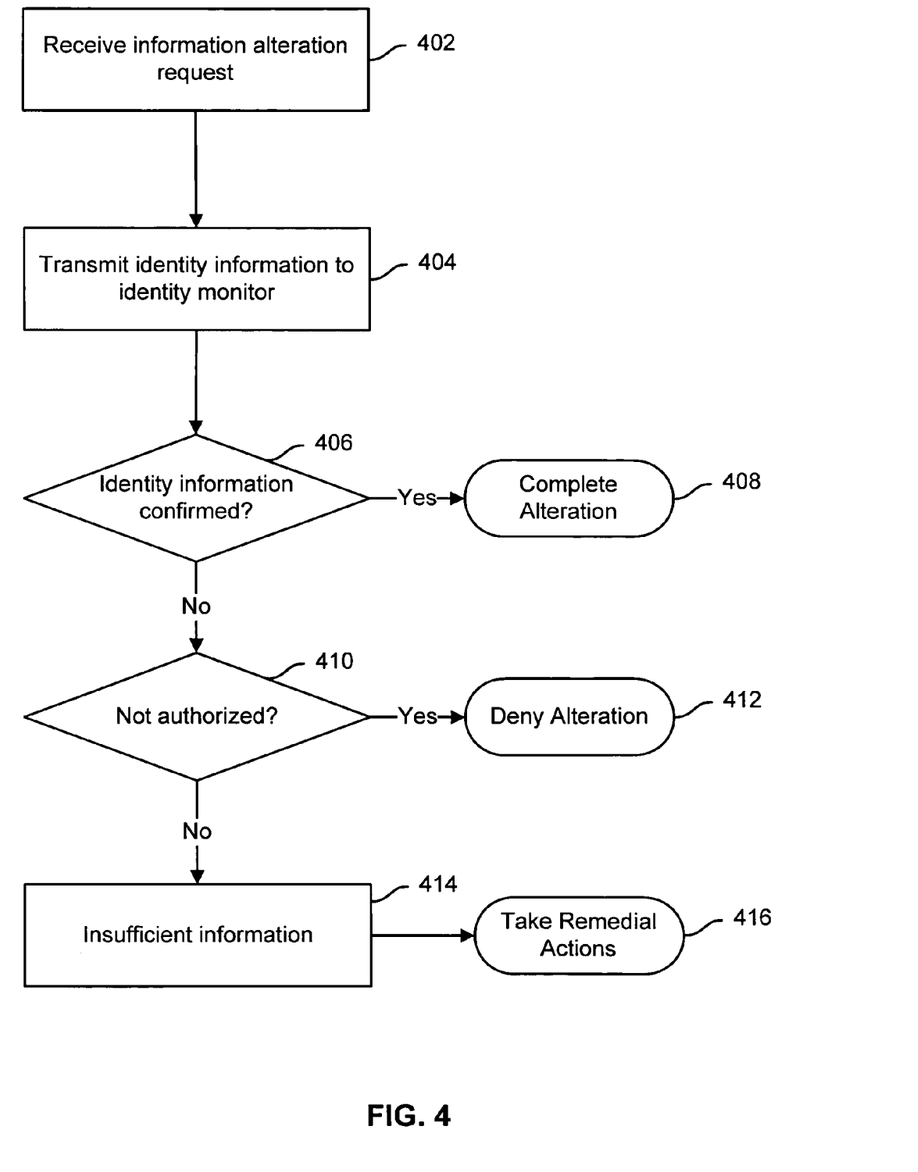
FIG. 4 is a flow chart illustrating an embodiment of a process for determining the legitimacy of a request to alter identity information.

FIG. 4 is a flow chart illustrating an embodiment of a process for determining the legitimacy of a request to alter identity information. In the example shown, the process is implemented by a site such as clothing retail site 112.

The process begins at 402 when a request to alter the information stored about a site visitor by the site is received. For example, at 402 a visitor to site, 112 may have clicked an account settings button, modified an address or phone number, and clicked a submit button. At 404 the identity information or a portion thereof is transmitted to identity monitor 104.

Multiple responses may be received back from identity monitor 104. For example, identity monitor 104 may explicitly state that the identity information has been confirmed (and that the user to whom the identity information belongs was ultimately responsible for the request received at 402). If the identity information is confirmed (406), the alteration can be safely completed by site 112 (408).

Identity monitor 104 may also explicitly indicate that the true owner of the identity information has indicated that he/she did not authorize and/or request an alteration of the identity information stored with site 112. If the identity information was denied (410), the alteration request in some embodiments is not completed by site 112 (412). In some cases, rather than refusing to complete the alteration at 412, other measures may be taken in response to a denial of information at 410. For example, site 112 may ask the visitor that submitted the request at 402 to send in proof of identity (such as a copy of a driver's license or passport), may require the visitor's bank to call the site to verify the identity of the visitor, etc.

Identity monitor 104 may also receive an indication that monitor 104 has insufficient information to determine the legitimacy of the request (414). In various embodiments, the indications received at 406, 410, and 414 and the actions taken at 408, 412, and 416 may vary as applicable. For example, site 112 may be configured to fail-safe—if no response is received from monitor 104, the lack of response may be treated by site 112 as an indication that the identity information is denied (i.e., the user to whom the identity information belongs did not request an alteration of the identity information stored with site 112 and the user's information is being misused by the visitor). Similarly, site 112 may be configured more permissively such that a lack of response from monitor 104 is treated as a confirmation of the identity information.

If the information is neither confirmed nor denied (414) a variety of actions can be taken. The information can be altered, the alteration can be denied, the visitor that submitted the information at 402 can be asked to provide additional identity information, can be charged a deposit, can be required to sign a statement attesting to his identity, etc.

Figure 5:
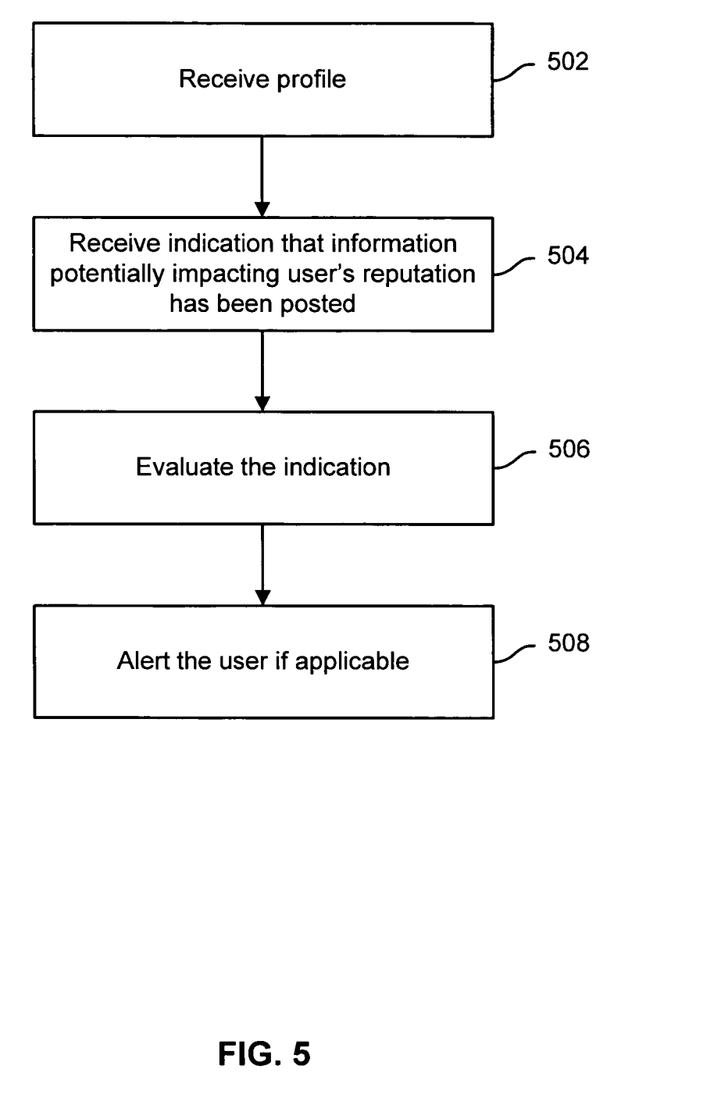
FIG. 5 is a flow chart illustrating an embodiment of a process for alerting a user about the posting of potentially derogatory reputation information.

FIG. 5 is a flow chart illustrating an embodiment of a process for alerting a user about the posting of potentially derogatory reputation information. In the example shown, the process is implemented by monitor 104. The process begins at 502 when a profile is received. In some embodiments user 102 visits monitor 104 such as with a web browser. User 102 provides identity information to monitor 104 (e.g., via an interactive wizard) which in turn creates and stores the received identity information as a profile at 502. Examples of information that could be received at 502 include all of the identities (e.g., the usernames) that the user has established at various sites in network 120—where the user shops, blogs, etc.

In various embodiments, other methods of profile acquisition are used instead of or in addition to collecting the information from a user through a form. For example, an agent resident on user 102's computer may gather the information based on information (entered passwords, ZIP codes, addresses, etc.) cached with user 102's web browser. Such an agent may automatically provide the information to monitor 104. If monitor 104 provides or works in conjunction with other services, such as those of a CardSpace framework identity provider, a user profile may be generated or augmented by information from that service. Profile information may also be collected by monitor 104 via a third party such as a credit bureau or information aggregator. Profile information may also be collected from a plurality of sources. In some cases the received profile includes both identity information and reputation information (e.g., auction site feedback scores).

At 504, an indication that information potentially impacting the user's reputation has been posted is received. In some cases the indication is received directly from a third party site. Suppose, for example, auction site 114 solicits and records buyer and seller feedback after each auction is complete. Site 114 may provide details (e.g., the userids of the parties involved, feedback scores, comments provided by the buyer/seller, etc.) to monitor 104 at 504. Similarly, monitor 104 may subscribe to RSS or other feeds of information provided by sites in network 120 and monitor them for indications of information that potentially impacts user reputations. In other cases, the indication may be received from a crawler such as crawler 108 that is configured to independently look for information that could impact user reputation without the cooperation of the third party site.

Typically at 506 it is determined whether the information received at 504 indicates a negative impact on the user's reputation (so that the user can take corrective action if necessary). In some embodiments information that is potentially neutral or positive of the user may also be monitored for (e.g., by authors seeking out positive "buzz" about things they write.)

One way to determine a negative impact in reputation is to determine whether the reputation information includes a decrease in a numeric reputation score (e.g., as computed by auction site 114). Another way to determine a negative impact in reputation is to monitor, e.g., a blog site, for mentions of the user by username. When a mention is detected, words surrounding the username can be evaluated to see if they are generally positive (e.g., "good," "excellent," "fun") or negative (e.g., "bad," "incompetent," "irritating").

In some embodiments users can specify types of reputation information with which they are concerned (e.g., auction feedback scores, blog posts) and types of reputation information with which they are not (e.g., anonymous comments left in blogs) or are less concerned. Based on the evaluation performed at 506, at 508 the user may be notified about the presence of the reputation information if applicable. For example, a user may configure monitor 104 to alert the user whenever blog posts that include the user's real name are made (e.g., because the user is a domestic violence victim and is attempting to keep identity information out of public forums). In such a case, the user might contact the blog author and request that initials be substituted for the user's real name. A user may also specify thresholds—e.g., to be notified when three negative feedbacks are left on the auction site, or whenever blog posts that include mention of the user are made by individuals other than those appearing on a whitelist that is, for example, stored as part of the profile received at 502.

In some cases the indication received at 504 may not impact the user's reputation or may not pertain to the user at all. Such may be the case, for example, if the user has recently started using the reputation monitoring tools, and/or when the information is received from crawler 108 while the crawler is crawling network 120 at large. Users may specify tolerances to be included in the determination performed at 506 and 508 including by instructing monitor 104 to ignore certain pieces of information. For example, a person having a common name may initially receive notifications about reputation information pertaining to another individual with the same name.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of monitoring for potential misuses of identity information comprising:
   creating, at a monitoring system, an electronic profile comprising first identity information of a user;
   receiving, at the monitoring system, from a third party website:
      a first indication that at least a portion of the first identity information has been used to successfully log into an account of the user that is maintained by the third party website; and
      a second indication that a request to alter second identity information of the user stored by the third party website has been initiated while the account was successfully logged into;
   evaluating whether the use of the first identity information is a potential misuse based on a match analysis of information from the electronic profile of the user created at the monitoring system, the first indication from the third party website that at least a portion of the first identity information has been used, and the second indication from the third party website that a request to alter second identity information of the user has been initiated, wherein match analysis criteria to determine the potential misuse of the first identity information is customizable by the user, an administrator of the monitoring system, or a combination thereof; and
   determining one or more actions to take if the use of the first identity information is a potential misuse, wherein the one or more actions include polling the user as to whether the use of the first identity information is a misuse and, in response to the user indicating that the use of the first identity information is a misuse, having the third party website request proof of identity to verify the identity of the person who submitted the request to alter the second identity information.

2. The method of claim 1 wherein the actions further include refusing the request to alter the second identity information.

3. The method of claim 1 further comprising updating the electronic profile based at least in part on a response by the user to the polling.

4. The method of claim 1 wherein the user is a first user and wherein the actions include polling a plurality of users as to whether the indicated use is a misuse.

5. The method of claim 1 wherein the third party website is an electronic commerce site.

6. The method of claim 1 wherein the third party website is a social networking site.

7. The method of claim 1 wherein the user is one of a plurality of users for whom monitoring for potential misuse of identity information is performed.

8. A system for monitoring for potential misuses of identity information, including:
   a processor; and
   a memory coupled with the processor, wherein the memory is configured to provide the processor with instructions which when executed cause the processor to:
      create an electronic profile comprising first identity information of a user;
      receive from a third party website:
         a first indication that at least a portion of the first identity information has been used to successfully log into an account of the user that is maintained by the third party website; and
         a second indication that a request to alter second identity information of the user stored by the third party website has been initiated while the account was successfully logged into;
      evaluate whether the use of the first identity information is a potential misuse based on a match analysis of information from the electronic profile of the user, the first indication from the third party website that at least a portion of the first identity information has been used, and the second indication from the third party website that a request to alter second identity information of the user has been initiated, wherein match analysis criteria to determine the potential misuse of the first identity information is customizable by the user, an administrator of the system, or a combination thereof; and
      determining one or more actions to take if the use of the first identity information is a potential misuse, wherein the one or more actions include polling the user as to whether the use of the first identity information is a misuse and, in response to the user indicating that the use of the first identity information is a misuse, having the third party website request proof of identity to verify the identity of the person who submitted the request to alter the second identity information.

9. The system of claim 8 wherein the actions further include refusing the request to alter the second identity information.

10. The system of claim 8 wherein the memory is further configured to provide the processor with instructions which when executed cause the processor to update the electronic profile based at least in part on a response by the user to the polling.

11. The system of claim 8 wherein the user is a first user and wherein the actions include polling a plurality of users as to whether the indicated use is a misuse.

12. A non-transitory computer storage medium having embodied thereon computer instructions which when executed by a computer cause the computer to perform a method comprising:
- creating, at the computer, an electronic profile comprising first identity information of a user;
- receiving from a third party website:
  - a first indication that at least a portion of the first identity information has been used to successfully log into an account of the user that is maintained by the third party website; and
  - a second indication that a request to alter second identity information of the user stored by the third party website has been initiated while the account was successfully logged into;
- evaluating whether the use of the first identity information is a potential misuse based on a match analysis of information from the created electronic profile from the computer, the indication from the third party website that at least a portion of the first identity information has been used, and the indication from the third party website that a request to alter second identity information of the user has been initiated, wherein match analysis criteria to determine the potential misuse of the first identity information is customizable by the user, an administrator of the computer, or a combination thereof; and
- determining one or more actions to take if the use of the first identity information is a potential misuse, wherein the one or more actions include polling the user as to whether the use of the first identity information is a misuse and, in response to the user indicating that the use of the first identity information is a misuse, having the third party website request proof of identity to verify the identity of the person who submitted the request to alter the second identity information.

13. The non-transitory computer storage medium of claim 12 wherein the actions further include refusing the request to alter the second identity information.

* * * * *